US011642979B2

(12) United States Patent
Tournabien et al.

(10) Patent No.: US 11,642,979 B2
(45) Date of Patent: May 9, 2023

(54) CONTROL DEVICE AND VEHICLE POWER DISTRIBUTION ARCHITECTURE INCORPORATING THE SAME

(71) Applicant: Aptiv Technologies Limited, St. Michael (BB)

(72) Inventors: Guillaume Tournabien, Dublin (IE); Markus Heinrich, Dublin (IE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/805,334

(22) Filed: Jun. 3, 2022

(65) Prior Publication Data
US 2022/0388423 A1 Dec. 8, 2022

(30) Foreign Application Priority Data

Jun. 4, 2021 (EP) ..................................... 21177800

(51) Int. Cl.
*H02J 7/00* (2006.01)
*H02J 7/14* (2006.01)
*B60L 58/10* (2019.01)

(52) U.S. Cl.
CPC ............ *B60L 58/10* (2019.02); *H02J 7/0031* (2013.01); *B60L 2240/547* (2013.01); *B60L 2240/549* (2013.01)

(58) Field of Classification Search
CPC ............................... B60L 58/10; H02J 7/0031
USPC ........................................................ 320/127
See application file for complete search history.

(56) References Cited

U.S. PATENT DOCUMENTS

| 9,041,341 | B2* | 5/2015 | Fink | ......................... | B60L 50/60 |
| | | | | | 320/120 |
| 9,979,371 | B1* | 5/2018 | Yi | ........................... | H03H 9/581 |
| 11,097,633 | B1* | 8/2021 | Kohn | ........................ | H02J 7/00 |
| 2010/0194354 | A1* | 8/2010 | Gotou | ..................... | B60L 53/14 |
| | | | | | 320/111 |
| 2011/0187184 | A1* | 8/2011 | Ichikawa | ................ | B60L 55/00 |
| | | | | | 307/10.1 |
| 2014/0200756 | A1* | 7/2014 | Sisk | ......................... | B60L 1/08 |
| | | | | | 903/903 |
| 2016/0114695 | A1* | 4/2016 | Holgers | ................ | B60L 3/0046 |
| | | | | | 903/907 |

(Continued)

OTHER PUBLICATIONS

"Extended European Search Report", EP Application No. 21177800.6, dated Nov. 29, 2021, 8 pages.

*Primary Examiner* — Alexis B Pacheco
(74) *Attorney, Agent, or Firm* — Colby Nipper PLLC

(57) ABSTRACT

Control device for controlling a switch in a charging line disposed between a first power line and a second power line in a power distribution architecture. The control device includes a current level input for receiving a current measurement of the current conducted through the charging line, a voltage level input for receiving a voltage measurement of the voltage applied on the charging line. A monitor monitors the relationship between the current and voltage measurements and generates a control signal for controlling the switch in response to a coherent change in the current and voltage measurements exceeding a threshold. A control signal is not generated when a change in one of the current and voltage measurements exceeding a threshold is not associated with a coherent change in the other of the current and voltage measurements.

20 Claims, 2 Drawing Sheets

(56) References Cited

U.S. PATENT DOCUMENTS

| | | | |
|---|---|---|---|
| 2016/0252585 A1* | 9/2016 | Baba | H02J 7/005 |
| | | | 702/63 |
| 2018/0105042 A1* | 4/2018 | Kuribara | B60L 58/10 |
| 2018/0229676 A1 | 8/2018 | Hudson et al. | |
| 2019/0131804 A1 | 5/2019 | Taniguchi et al. | |
| 2019/0229382 A1* | 7/2019 | Machida | B60L 58/12 |
| 2019/0232788 A1* | 8/2019 | Kimura | B60L 50/51 |
| 2020/0207296 A1* | 7/2020 | Maekawa | H03K 17/6871 |

* cited by examiner

CONTROL DEVICE AND VEHICLE POWER DISTRIBUTION ARCHITECTURE INCORPORATING THE SAME

INCORPORATION BY REFERENCE

This application claims priority to European Patent Application Number EP21177800.6, filed Jun. 4, 2021, the disclosure of which is incorporated by reference in its entirety.

BACKGROUND

Energy distribution within automotive applications is an important consideration when designing system architectures. Given the increasing prevalence of autonomous driving and the integration of enhanced safety technologies, a standard vehicle now possesses many automotive modules which require a supply of power. Importantly, it is common to differentiate between critical and non-critical modules. Critical modules are those that are paramount to safe operation of the vehicle and would normally include steering, advanced driver-assistance system (ADAS), and braking functionality. In contrast, non-critical modules would normally include interior lighting, media, and climate control systems. Due to the importance of critical modules, it is desirable to ensure that the power architecture provides for those modules to be connected to a power line that is unaffected by disturbances that might arise from varying energy availability.

In this respect, in the event of a loss of power, some non-critical modules may be configured to be preventatively disabled in order that the remaining power supply is directed towards the critical modules for as long as possible. For this, automotive power architectures may isolate the critical modules on a first power line, whilst the non-critical modules are kept apart on a second power line. However, a charging line is required between these power lines to allow the energy store, such as a battery or supercapacitor, to be charged when the vehicle is running normally.

In view of the above, a fuse may be provided in the charging line in order to protect the energy store and the critical modules in the event of a short circuit. That is, a short circuit on the second power line may cause a relatively high reverse current to be drawn from the energy store. This would result in the voltage on the first power line dropping low, which may affect the operation of the critical modules. The provision of the fuse can prevent this by breaking the connection when the reverse current exceeds the fuse's threshold. However, a problem with this solution is that the fuse will only melt if the energy store is sufficiently charged to supply a current exceeding the rating of the fuse. This is not always the case.

To address the above, more modern arrangements replace the melting fuse with a switch or a number of field effect transistor (FET) switches under the control of a controller. FIG. 1 shows a schematic illustration of such a conventional arrangement within a vehicle power distribution architecture 10. In this architecture, a battery 2 provides the main power source for supplying energy to one or more critical modules 4 via a first power line 3. Simultaneously, the non-critical modules 5 are supplied via a second power line 8 connected to the vehicle's generator or DC/DC converter 9 for supplying these modules when the vehicle is running. Furthermore, a charging line 7 is provided between the first power line 3 and the second power line 8. When the vehicle is running, the generator or DC/DC-Converter 9 will charge the battery 2 by applying a forward current through the charging line 7. However, to protect the first power line 3 in the event of a disturbance on the second power line 8, a switch 6 is provided on the charging line 7 and is controlled by a protection controller 11. The protection controller 11 monitors the voltage on the charging line 7 and, in response to the detection of a change in the voltage exceeding a threshold (e.g. an increase above a voltage threshold, or a drop below a threshold), will output a control signal for opening the switch 6. This thereby allows the critical modules 4 to be disconnected from the secondary power line 8.

There are however a number of problems with these existing architectures. Firstly, in opening the switch 6 to disconnect the first power line 3 from the second power line 8, significant damage can occur to the switch 6 itself. This is in part due to the relatively high amounts of energy that may be delivered by the system. For example, if the current through the charging line 7 is over 200 A, many joules of energy will be applied to the switch, which can lead to damage or compromise its long-term reliability. Furthermore, the dissipation of energy may also necessitate the provision of heat sinks and thermal management systems to maintain operation of the switch. This increases the cost and size of the assembly as a whole.

The issue of damage to the switch 6 may also be further exacerbated by unnecessary switching in response to transient anomalies, such as electromagnetic compatibility (EMC) disturbances and microcurrents. That is, the protection system is typically required to react within 100 μs for automotive applications. However, this fast reaction time makes the system sensitive to temporary disturbances. This can cause the switch 6 to be subjected to a higher number of operating cycles, which together with the energy applied, lead to reduced switch lifespan. At the same time, unnecessary switching can lead to the supply of power to the non-critical modules 5 being interrupted unnecessarily.

In view of the above, there remains a need for an improved protection device for a vehicle power distribution architecture.

SUMMARY

According to a first aspect, there is provided a control device for controlling a switch in a charging line disposed between a first power line and a second power line in a power distribution architecture, the device including: a current level input for receiving a current measurement of the current conducted through the charging line; a voltage level input for receiving a voltage measurement of the voltage applied on the charging line; a monitor for monitoring the relationship between the current and voltage measurements and for generating a control signal for controlling the switch in response to a coherent change in the current and voltage measurements exceeding a threshold, and for not generating a control signal when a change in one of the current and voltage measurements exceeding a threshold is not associated with a coherent change in the other of the current and voltage measurements.

In this way, a control device for a power protection switch may be provided which is able to differentiate between transient disturbances and more significant power disturbance events, such as an overcurrent or short circuit scenario. This determination may be based on the correlation between changes in current and voltage on the charging line. For example, a detected voltage drop which coincides with a corresponding increase in current as power is drawn through the charging line would be indicative of a disturbance event, such as an overcurrent or short circuit. In response, the controlling device may thereby trigger the switch to open for disconnecting the power lines. Conversely, a drop in measured voltage that does not coincide with a corresponding increase in current may be attributed to a transient disturbance which does not require disconnection. This thereby allows the system to maintain power to non-critical modules without unnecessary interruptions caused by transitory disturbances. As a consequence, the switching frequency is reduced, thereby mitigating potential damage to the switch and providing a triggering device with an improved reliability and lifespan.

In embodiments, the monitor includes a mixer for combining the current and voltage measurements. In this way a current and voltage may be simultaneously compared in the time domain for identifying coherent changes in current and voltage.

In embodiments, the monitor includes a microcontroller. In this way, the mixing of the current and voltage measurements may be provided in a programmable digital solution. In other embodiments, the monitor may be implemented with analog electronic components.

In embodiments, the monitor includes a current-voltage coherence model and wherein the monitor compares the current and voltage measurements to the current-voltage coherence model for identifying coherent changes in the current and voltage measurements. In this way, a predetermined model may be provided for defining an expected characteristic between current and voltage, and consequently a measured current and voltage that deviates from the expected characteristic may be attributed to a transient disturbance, rather than a substantive power supply disturbance event.

In embodiments, at least one of the current level input, the voltage level input, and the monitor includes a filter. In this way, smaller transient disturbances may be filtered out.

In embodiments, the filter is a Cauer filter. In this way, the Cauer or Elliptic filter may provide a fast transition in gain between the passband and stopband. This allows the filters to be finely tuned to filter out disturbances depending on the physical characteristics of the associated circuit components, whilst providing a high gain for valid signals.

In embodiments, at least one of the current level input and the voltage level input includes a filter, wherein the filter is configured such that its stopband filters out transient disturbances in the respective current and voltage measurements.

In embodiments, the threshold is a voltage threshold, and wherein the monitor generates the control signal in response to a change in the voltage measurement exceeding the voltage threshold, where the change is associated with a coherent change in the current measurement. In this way, a voltage change greater than the threshold which results in a current flow may be identified as a power event and prompt the controlling device to open the switch.

In embodiments, the voltage threshold is a minimum required voltage and wherein the monitor generates the control signal in response to a voltage drop exceeding the minimum required voltage threshold, where the voltage drop is associated with a coherent change in the current measurement. In this way, the controlling device may isolate the power lines in the event of, for example, a short circuit on the secondary power line. That is, a short circuit would cause a voltage drop on the charging line relative to the first power line. This in turn would act to draw a current through the charging line. This would thereby manifest as a measured drop in voltage coinciding with a coherent increase in measured current. As such, the controlling device may control the disconnection of the charging line.

In embodiments, the control signal is for controlling the switch for disconnecting the first power line from the second power line.

In embodiments, the current level input further includes a current sensor for detecting the current measurement, and wherein the voltage level input further includes a voltage sensor for detecting the voltage measurement. In this way, the controlling circuit may incorporate the sensors.

According to a second aspect, there is provided a vehicle power distribution architecture including: an energy store; a generator or DC/DC converter; a first power line for connecting the energy store to one or more critical modules; a second power line for connecting the generator or DC/DC converter to one or more non-critical modules; a charging line connected between the first power line and the second power line; a switch located on the charging line; and a controlling device for controlling the switch, wherein the controlling device includes a current level input for receiving a current measurement of the current conducted through the charging line; a voltage level input for receiving a voltage measurement of the voltage applied on the charging line; a monitor for monitoring the relationship between the current and voltage measurements and for generating a control signal for controlling the switch in response to a coherent change in the current and voltage measurements exceeding a threshold, and for not generating a control signal when a change in one of the current and voltage measurements exceeding a threshold is not associated with a coherent change in the other of the current and voltage measurements.

BRIEF DESCRIPTION OF THE DRAWINGS

Illustrative embodiments will now be described with reference to the accompanying drawings in which.

DETAILED DESCRIPTION

The present disclosure relates to a control device for a vehicle power architecture and a vehicle power distribution architecture. The present disclosure is particularly relevant to automotive power safety devices, and systems and devices for current protection in vehicle power lines.

Figure 1:
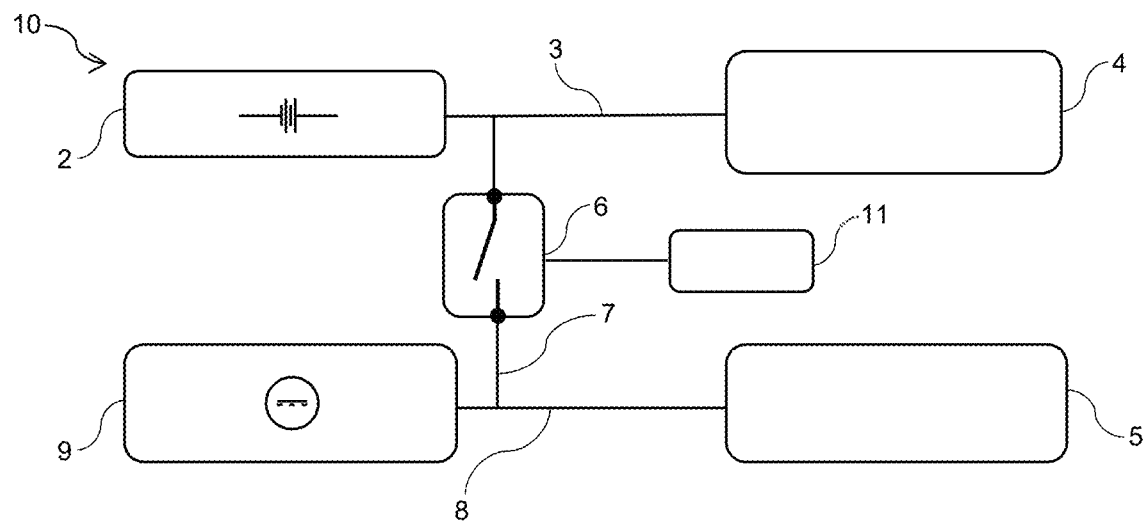
FIG. 1 shows a schematic illustration of a vehicle power distribution architecture according to the prior art.
Figure 2:
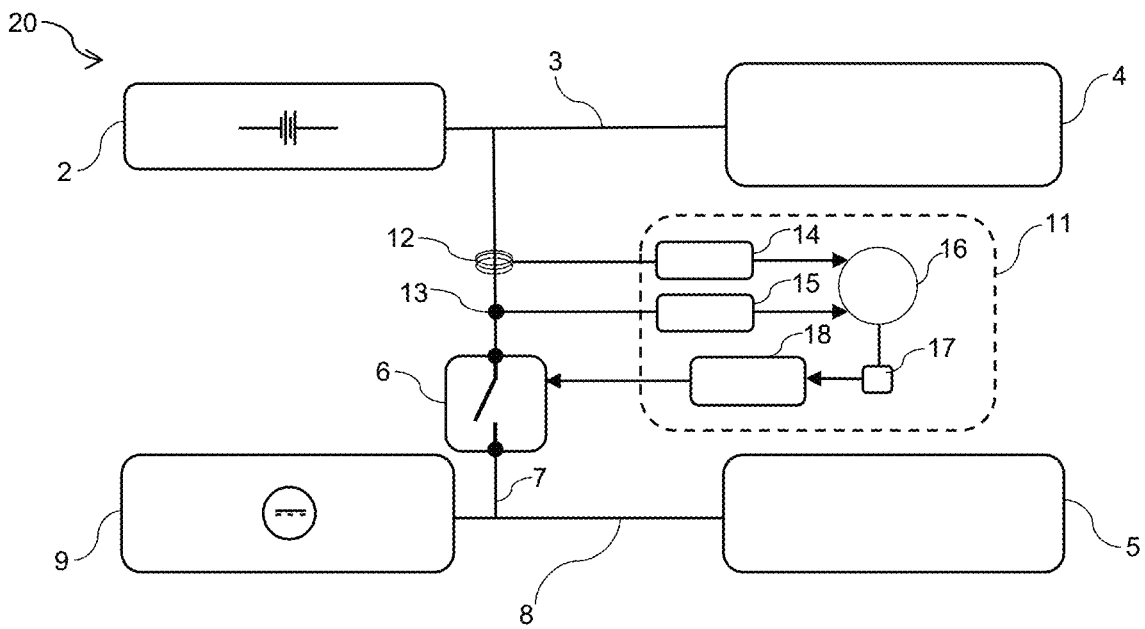
FIG. 2 shows a schematic illustration of a vehicle power distribution architecture incorporating a control device according to an illustrative embodiment.

FIG. 2 shows a control device 11 incorporated into a vehicle power distribution architecture 20 according to an illustrative embodiment. The architecture 20 includes a first power line 3 to connect between a battery 2 and one or more critical modules 4. A second power line 8 is provided between a generator or DC/DC converter 9 and one or more non-critical modules 5. A charging line 7 connects the battery 2 and the generator or DC/DC converter 9 via the first and second power lines 3, 8. The charging line 7 includes a switch 6 that, when open, disconnects the first power line 3 from the second power line 8, similar to the arrangement shown in FIG. 1.

The control device 11 is provided for controlling the opening and closing of the switch 6. As such, the control device 11 provides a triggering device for triggering a protection response.

The control device 11 includes a mixer 16 and a logic module 18. The mixer 16 is connected to a current sensor 12 through a current Cauer filter 14 and is connected to a voltage sensor 13 through voltage Cauer filter 15. As such, the current and voltage sensors and filters respectively form current and voltage inputs to the mixer 16 for inputting a current measurement and a voltage measurement, respectively.

The mixer 16 and logic module 18 form a monitor for monitoring the measured current and voltage received from the current and voltage sensors 12, 13. The mixer combines the current and voltage measurements in the time domain for comparing the coherence of the two measurements. In this embodiment, for example, the mixer 16 subtracts the current measurement from the voltage measurement and outputs a correlated value to the controller 16 that is indicative of the coherence between the two measurements. That is, if the rate of change in one of the measurements is not reflected in a corresponding change in the other, the delta output will increase, indicating a transient disturbance, as is described in further detail below.

In this embodiment, the output of the mixer 16 is fed through a mixer Cauer filter 17 to the logic module 18. The mixer Cauer filter 17 is configured to filter out any transient disturbances from the correlated value.

The logic module 18 receives the correlated value reading from the mixer 16 and based on a logic determination generates a control signal for controlling the opening of the switch 6 to disconnect the first power line 3 from the second power line 8. As described in further detail below, in this embodiment, the logic determination is based on the voltage measured by voltage sensor 13 dropping below a threshold, at the same time as a coherent increase in the current measured by current sensor 12.

Figure 3A:
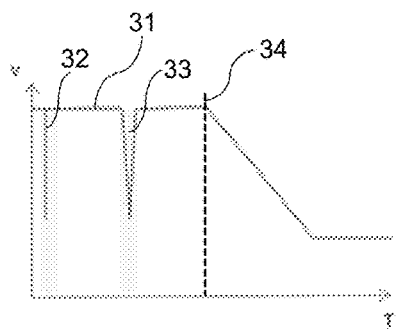
FIG. 3A shows a schematic illustration of the voltage responses in an example power event scenario.
Figure 3B:
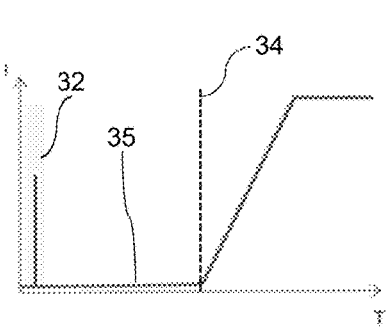
FIG. 3B shows a schematic illustration of the current responses in an example power event scenario.

In this connection, FIGS. 3A and 3B shows schematic illustrations of the current and voltage responses in an example power event scenario. FIG. 3A shows the voltage 31 over a time period which includes three detected disturbances. The first event 32 is a short transient disturbance in which the voltage drops only briefly. The second event 33 is a more prolonged transient disturbance associated with a longer measured voltage drop. The third event 34 is a significant disturbance event caused by a short circuit on the secondary power line 8. In this case, following the event, there is a sustained voltage drop from a higher Vbat level down to a low level.

FIG. 3B shows the current 35 over the same time period shown in FIG. 3A. In this case, in the first event 32, the short transient disturbance may be recorded as a momentary spike in current. This may occur, for instance, if a transitory interference disturbance effects both the current and voltage sensors 12, 13 simultaneously. In contrast, the second event 33 of the more prolonged transient disturbance does not produce a corresponding increase in the current. This is because the transient disturbance does not generate an actual voltage drop on the charging line 7 which would cause a reverse current flow through the charging line. Conversely, the third event 34 arising from a short circuit on the secondary power line 8 causes a reverse current to flow, driven by the voltage drop across the charging line 7.

Figure 3C:
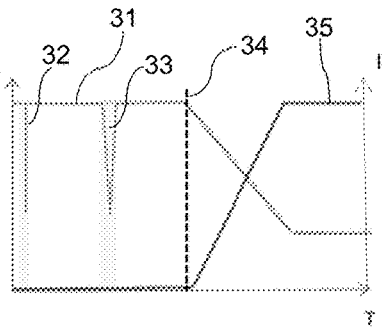
FIG. 3C shows a schematic illustration of the current and voltage responses in an example power event scenario.

FIG. 3C shows a combined plot of measured voltage 31 and current 35 from FIGS. 3A and 3B. In this case, the momentary spike in current associated with the first event 32 has been filtered by the current Cauer filter 14. As such, the drop in measured voltage 31 associated with this event does not coincide with a coherent spike in current 35. Equally, longer measured voltage drop associated with the second event 33 also does not coincide with a coherent increase in current 35. However, the third event 34 results both in a sustained drop in voltage 31, along with a coherent increase in current 35. Consequently, transient events can be differentiated from substantive disturbance events, such as short circuits, based on the coherence of the voltage and current response.

Figure 4:
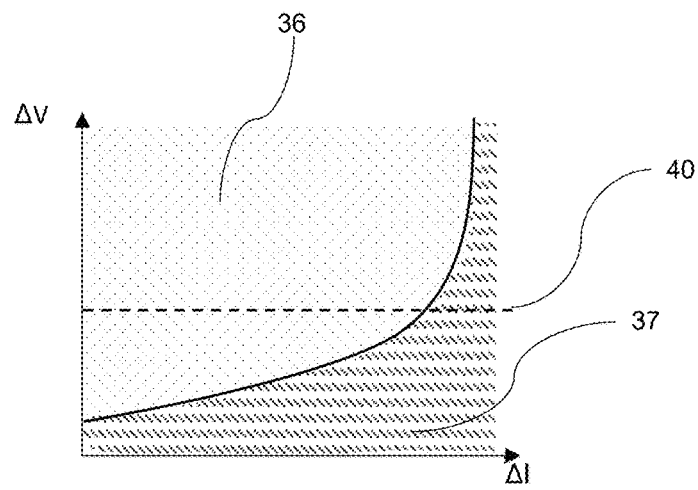
FIG. 4 shows a schematic illustration of an example coherence model implemented by the control device.

In this connection, FIG. 4 shows a schematic illustration of an example coherence model implemented by the mixer 16 and logic module 18. In this model, the change in measured voltage ($\Delta V$) is plotted against change in measured current ($\Delta I$), with the expected characteristics being based on the physical properties of the components. Where a large change (e.g. drop) in measured voltage (V) is detected, it would be expected for this to coincide with a large change in measured current (e.g., an increase). Accordingly, when the measured values are in the invalid coherence region 36, these may be determined to arise from transient disturbances. Conversely, measured values in the valid coherence region 37 would be deemed indicative of valid measurements.

At the same time as the above, the logic module 18 applies a voltage threshold 40 to indicate the occurrence of a substantive disturbance event, such as a short circuit. The validity of such an event is determined based on whether it occurs within the valid coherence region 37 shown in FIG. 4. That is, where there is a change in voltage exceeding the threshold 40 which also coincides with a measured change within the valid coherence region 37, the logic module 18 generates a control signal for disconnecting the switch 6. In contrast, if the measured change in voltage exceeds the threshold 40, but the change in current is within the invalid coherence region 36, the logic module 18 does not trigger the control signal. The switch 6 may thereby be held in its closed state for maintaining operation of the non-critical modules 5.

Figure 5A:
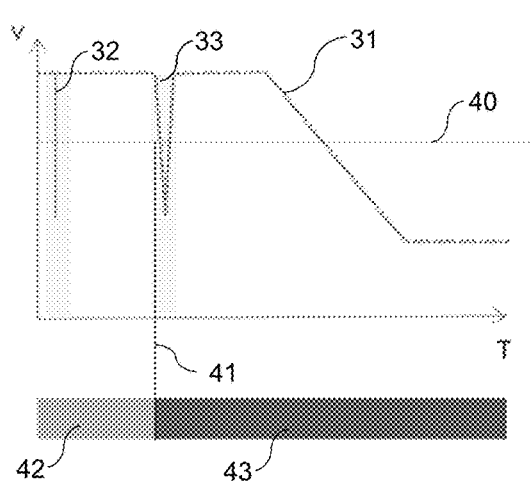
FIG. 5A shows a schematic illustration of the combined current and voltage response in the example power event scenario with the prior art vehicle power distribution architecture.
Figure 5B:
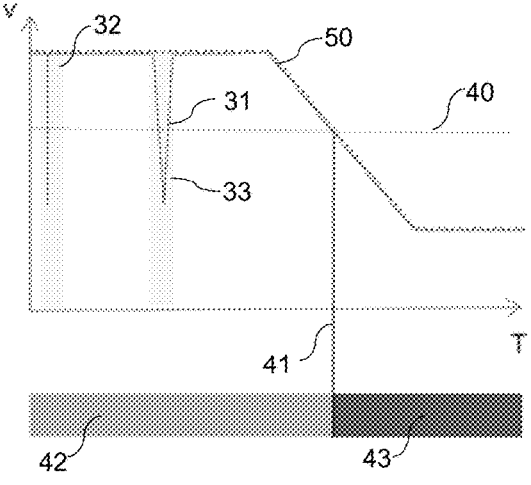
FIG. 5B shows a schematic illustration of the combined current and voltage response in the example power event scenario with the vehicle power distribution architecture according to the illustrative embodiment.

FIGS. 5A and 5B explain this operation in further detail by contrasting the prior art switch control with the illustrative embodiment. In FIG. 5A, a prior art controller 11 is subjected to the example power event scenario set out in FIG. 3. The prior art controller may use conventional filtering to ignore the very short first disturbance event 32. However, the second event 33 causes a more prolonged drop in voltage which cannot be filtered conventionally. As the system has no awareness that this is merely a transient disturbance, the effect of the voltage exceeding the threshold 40 (i.e., dropping below it), triggers the generation of a control signal for opening the switch 6. Therefore, the switch 6 transitions from a closed state 42 to an open state 43 at the protection triggering point 41. As such, the non-critical modules are disconnected from the battery 2 well before a substantive event occurs, if at all.

In contrast to the above, FIG. 5B, shows the illustrative embodiment in the same scenario. Again, the first disturbance event 32 is ignored by filtering. For the second event, the voltage drop 31 is also ignored because this doesn't coincide with a coherent increase in current. This is illustrated by the correlated current/voltage measurement line 50 in FIG. 5B remaining flat during this disturbance. However, if there is a significant disturbance event, caused by a short circuit, the current and voltage both change coherently, as shown by the correlated current/voltage measurement line 50. Once this exceeds the threshold 40 (i.e., drops below it), the logic module 18 triggers the control signal to open the switch 6. Importantly, as shown in contrast to FIG. 5A, the protection triggering point 41 in FIG. 5B is much later. Consequently, the switch is maintained in the closed state 42 for longer.

In this way, the control device 11 is able to react quickly (e.g., in less than 100 μs) to protect the critical modules 4, whilst avoiding the need to unnecessarily disconnect the non-critical modules 5 because of transient disturbances. This thereby provides both better operation and a more robust system.

It will be understood that the embodiment illustrated above show an application only for the purposes of illustration. In practice, embodiments may be applied to many different configurations, the detailed embodiments being straightforward for those skilled in the art to implement.

For example, although the arrangement allows for short circuit protection without the need for complex microprocessors, it will be understood that implementations may be used in conjunction with one or more microprocessors, for instance to provide performance feedback and fault monitoring.

It will also be understood that although the above illustrative architecture uses a battery, other energy stores, such as supercapacitors or an array of batteries may be alternatively used.

What is claimed is:

1. A control device for controlling a switch in a charging line disposed between a first power line and a second power line in a power distribution architecture, the control device comprising:
    a current level input for receiving a current measurement of a current conducted through the charging line;
    a voltage level input for receiving a voltage measurement of a voltage applied on the charging line; and
    a monitor for monitoring a relationship between the current and voltage measurements and for generating a control signal for controlling the switch in response to a coherent change in the current and voltage measurements exceeding a threshold, and for not generating a control signal when a change in one of the current and voltage measurements exceeding a threshold is not associated with a coherent change in the other of the current and voltage measurements, the monitor comprising a mixer for combining the current and voltage measurements,
    wherein at least one of the current level input, the voltage level input, or the monitor comprises a Cauer filter.

2. The control device according to claim 1, wherein the monitor further comprises a microcontroller.

3. The control device according to claim 1,
    wherein the monitor comprises a current-voltage coherence model.

4. The control device according to claim 1,
    wherein at least one of the current level input or the voltage level input comprises a filter having a stopband, and wherein the filter is configured such that the stopband filters out transient disturbances in the respective current and voltage measurements.

5. The control device according to claim 1,
    wherein the threshold is a voltage threshold, and
    wherein the monitor generates the control signal in response to a change in the voltage measurement exceeding the voltage threshold, where the change is associated with a coherent change in the current measurement.

6. The control device according to claim 5,
    wherein the voltage threshold is a minimum required voltage, and
    wherein the monitor generates the control signal in response to a voltage drop exceeding the minimum required voltage threshold, where the voltage drop is associated with a coherent change in the current measurement.

7. The control device according to claim 1, wherein the control signal is for controlling the switch for disconnecting the first power line from the second power line.

8. The control device according to claim 1,
    wherein the current level input further comprises a current sensor for detecting the current measurement.

9. The control device according to claim 3,
    wherein the monitor compares the current and voltage measurements to the current-voltage coherence model for identifying coherent changes in the current and voltage measurements.

10. The control device according to claim 4,
    wherein the filter is configured such that the stopband filters out transient disturbances in the respective current and voltage measurements.

11. The control device according to claim 8,
    wherein the voltage level input further comprises a voltage sensor for detecting the voltage measurement.

12. The control device according to claim 1,
    wherein at least one of the current level input or the voltage level input comprises a filter having a stopband,
    wherein the filter is configured such that the stopband filters out transient disturbances in the respective current and voltage measurements, and
    wherein the control signal is for controlling the switch for disconnecting the first power line from the second power line.

13. The control device according to claim 1,
    wherein at least one of the current level input or the voltage level input comprises a filter having a stopband,
    wherein the filter is configured such that the stopband filters out transient disturbances in the respective current and voltage measurements,
    wherein the current level input further comprises a current sensor for detecting the current measurement.

14. A control device according to claim 1,
    wherein the monitor further comprises a microcontroller,
    wherein the monitor further comprises a current-voltage coherence model,
    wherein the monitor compares the current and voltage measurements to the current-voltage coherence model for identifying coherent changes in the current and voltage measurements,
    wherein at least one of the current level input or the voltage level input comprises a filter having a stopband,
    wherein the filter is configured such that the stopband filters out transient disturbances in the respective current and voltage measurements, wherein the control signal is for controlling the switch for disconnecting the first power line from the second power line, wherein the current level input further comprises a current sensor for detecting the current measurement, and wherein the voltage level input further comprises a voltage sensor for detecting the voltage measurement.

15. The control device according to claim 13, wherein the voltage level input further comprises a voltage sensor for detecting the voltage measurement.

16. The control device according to claim 12, wherein the monitor further comprises a microcontroller.

17. The control device according to claim 16, wherein the monitor comprises a current-voltage coherence model.

18. The control device according to claim 17, wherein the monitor compares the current and voltage measurements to the current-voltage coherence model for identifying coherent changes in the current and voltage measurements.

19. The control device according to claim 18, wherein the current level input further comprises a current sensor for detecting the current measurement.

20. The control device according to claim 19, wherein the voltage level input further comprises a voltage sensor for detecting the voltage measurement.

* * * * *